United States Patent
Kobayashi et al.

(10) Patent No.: US 6,471,740 B2
(45) Date of Patent: Oct. 29, 2002

(54) AIR FILTER

(75) Inventors: Sadao Kobayashi; Masayuki Imafuku; Yoshihide Wakayama, all of Tokyo (JP)

(73) Assignee: Taisei Corporation (JP)

( * ) Notice: Subject to any disclaimer, the term of this patent is extended or adjusted under 35 U.S.C. 154(b) by 0 days.

(21) Appl. No.: 09/736,647

(22) Filed: Dec. 13, 2000

(65) Prior Publication Data

US 2001/0000375 A1 Apr. 26, 2001

Related U.S. Application Data

(60) Continuation of application No. 09/405,756, filed on Sep. 27, 1999, now Pat. No. 6,293,982, which is a division of application No. 08/817,007, filed as application No. PCT/JP96/02076 on Jul. 25, 1996, now Pat. No. 5,997,598.

(30) Foreign Application Priority Data

Jul. 27, 1995 (JP) .............................................. 7-192090

(51) Int. Cl.$^7$ ............................................. B01D 46/00
(52) U.S. Cl. ......................................... 55/502; 55/524
(58) Field of Search ............................ 55/385.2, 385.4, 55/502, 524, DIG. 24, DIG. 31; 454/187

(56) References Cited

U.S. PATENT DOCUMENTS

| | | | |
|---|---|---|---|
| 3,066,462 A | 12/1962 | Yap et al. | 55/524 |
| 3,137,589 A | 6/1964 | Reinhard et al. | 55/524 |
| 3,520,416 A | 7/1970 | Keedwell | 55/524 |
| 4,178,271 A | 12/1979 | Busch et al. | 260/17 R |
| 4,248,929 A | 2/1981 | Morgan et al. | 55/524 |
| 4,270,933 A | 6/1981 | Meny et al. | 55/524 |
| 4,370,376 A | 1/1983 | Gangal et al. | 55/524 |
| 5,032,450 A | 7/1991 | Rechlicz et al. | 428/196 |
| 5,262,444 A | 11/1993 | Rusincovitch et al. | 521/50.5 |
| 5,459,943 A | 10/1995 | Tanahashi | 55/385.2 |
| 5,507,847 A | 4/1996 | George et al. | 55/502 |
| 5,525,136 A | 6/1996 | Rosen | 55/524 |
| 5,626,820 A | 5/1997 | Kinkead et al. | 454/187 |
| 5,827,339 A | 10/1998 | Nagafune et al. | 55/385.2 |
| 5,833,726 A | 11/1998 | Kinkead et al. | 55/385.2 |
| 5,997,598 A * | 12/1999 | Kobayashi et al. | 55/502 |
| 6,106,586 A * | 8/2000 | Kobayashi et al. | 55/502 |
| 6,293,982 B1 * | 9/2001 | Kobayashi et al. | 55/385.2 |

FOREIGN PATENT DOCUMENTS

| | | |
|---|---|---|
| EP | 0165940 | 1/1991 |
| JP | U-62-56614 | 4/1987 |
| JP | A-6286248 | 4/1987 |
| JP | U-62-124102 | 8/1987 |
| JP | 63-209722 | 8/1988 |
| JP | 64-38226 | 2/1989 |
| JP | 2108712 | 2/1990 |
| JP | 2-83009 | 3/1990 |
| JP | 4-78405 | 3/1992 |
| JP | 5-7316 | 5/1993 |
| JP | 6285318 | 11/1994 |
| JP | 7-3288359 | 12/1995 |
| WO | WO 85 02351 | 6/1985 |
| WO | WO 94 18246 A | 8/1994 |

* cited by examiner

Primary Examiner—C. Scott Bushey
(74) Attorney, Agent, or Firm—Young & Basile, P.C.

(57) ABSTRACT

A material not releasing gaseous organic substances during use is used as a filter medium and a sealing material for tightly sealing between the medium and a frame. Specifically, a synthetic paraffin not containing an aliphatic hydrocarbon having not more than 19 carbon atoms or less is used as a non-silicone type water repellent contained in a treatment agent for forming fibers into a cloth-like filter medium. A carboxylic acid ester having 400 or more molecular weight is used as a plasticizer and a phenolic compound having 300 or more molecular weight is used as an antioxidant to be added to the treatment agent and the sealing material. This enables that the gaseous organic substances are not present in a clean room, a semiconductor production apparatus or the like. Further, if the filter medium and the sealing material are formed of a material not releasing organic phosphorus compounds and boron compounds in the air, a clean room and a local facility particularly suitable for use in the production of semiconductors are provided.

6 Claims, No Drawings

AIR FILTER

CROSS-REFERENCE TO RELATED APPLICATIONS

This application is a continuation of co-pending U.S. Ser. No. 09/405,756, filed Sep. 27, 1999, now U.S. Pat. No. 6,293,982, which is itself a divisional of U.S. Ser. No. 08/817,007, filed Mar. 27, 1997, now U.S. Pat. No. 5,997,598, which was filed under 35 U.S.C. 371 as the national stage application of PCT/JP96/02076, filed Jul. 25, 1996, and published as WO97/04851 on Feb. 13, 1997.

TECHNICAL FIELD

The present invention concerns an air filter for use in a clean room used, for example, in factories or research laboratories relevant to the field of semiconductors, foodstuffs and biotechnology, a method of manufacturing thereof, a local facility and a clean room equipped with the air filter.

BACKGROUND ART

In clean rooms used heretofore, for example, in factories or research laboratories in the relevant field of semiconductors, foodstuffs, medicines and biotechnology, dry air filters for trapping air-born particles are disposed to air introduction paths and air passing there through is introduced into the clean room.

Air filters used at present in clean rooms include ULPA (abbreviation for Ultra Low Penetration Air) using glass fibers for the filter medium and HEPA (abbreviation for High Efficiency Particle Air), and such filters are excellent filters in view of removal of dusts and, for example, ULPA filters can remove fine particles even of 0.1 µm. Further, non-glass type filters using fluoro resin or quartz fibers instead of the glass fibers for the filter medium have also been developed so as not to release inorganic substances from the air filters.

Recently, with the increase of integration degree of semiconductors, diffusing of gaseous organic substances as well as dusts in the clean room air have considered to be the cause of defects. That is, it has been pointed out that organic substances are adsorbed on the surface of semiconductor substrates (silicon wafers) in clean rooms, to deteriorate device characteristics (for example, Fujii, "Gaseous Contaminants and Current Situation for Countermeasure of Removal", Air Cleaning, Vol. 32, No. 3, p 43 (1994), published from the Foundation of Japan Air Cleaning Society).

Further, it has been well-known that an n-type semiconductor is obtained by doping P (phosphorus) and a p-type semiconductor is obtained by doping B (boron, into a silicon wafer in semiconductor manufacturing steps but, if phosphorus compounds or boron compounds are present in the clean room air, these may possibly cause unnecessary doping, so that it is necessary to remove such ingredients from the clean room air.

The present invention has been accomplished to solve the problems described above and it is an object thereof to provide an air filter for trapping air-born particles that can eliminate the presence of gaseous organic substances, for example, in clean rooms, semiconductor production apparatus or the like, a method of manufacturing an air filter therefor, a treatment agent constituting the air filter, a method of manufacturing a filter medium, a clean room and a local facility such as a semiconductor production apparatus in which gaseous organic substances are not present, as well as a clean room and a local facility in which phosphorus compounds and boron compounds are not present.

DISCLOSURE OF THE INVENTION

The present inventors have made earnest studies for attaining the foregoing object and, as a result, have accomplished the present invention based on the finding that presence of gaseous organic substances in a clean room and a local facility such as a semiconductor production apparatus is mainly caused by air filters disposed to air introduction paths and gaskets intervened for attaching the air filters to openings, for example, of a ceiling.

That is, it has been found by the study of the present inventors that gaseous organic substances such as cyclosiloxanes, carboxylic acid esters, phosphoric acid esters, hydrocarbons, and phenols are released from the existent air filters described above and that such organic substances are released from treatment agents impregnated between each of fibers upon forming the fibers into a cloth-like filter medium (including a binder for binding fibers, a water repellent for improving dust trapping effect and a plasticizer or an antioxidant), silicone oils deposited to fibers in a case where the filter medium is glass fibers (this is a reinforcing material upon spinning glass fibers which serves also as a water repellent of the filter medium) and sealing materials for bonding a filter medium and a frame. Further, it has also been found that organic substances are detected at a high ratio also from rubber materials used so far as gaskets.

Specifically, it has been found that the ingredient of the conventional water repellent (non-silicone type) in the treatment agent is liquid paraffins (aliphatic hydrocarbon having 12 to 18 carbon atoms) which contain a plasticizer or an antioxidant of relatively low molecular weights Further, while the sealing material comprising a polyurethane or epoxy type resin as the main ingredient is used, it has been found that isocyanates of the main agent left after the curing reaction become organic contaminations in a case of a two component polyurethane resin, while amine compounds used as a curing agent become organic contaminations in a case of a two component epoxy resin. It has also been found that conventional sealing materials contain plasticizers and antioxidants of relatively low molecular weight.

Based on the findings described above, the present invention provides an air filter comprising a filter medium formed of fibers treated with a treatment agent into a cloth-like shape, a frame for containing the filter medium and a sealing material for tightly sealing a portion between the frame and the filter medium for trapping air-born particles, wherein at least one of the filter medium and the sealing material does not release gaseous organic substances during use.

Further, the present invention provides an air filter satisfying one of the following definitions (a)–(c) and (e)–(g) for the treatment agent and the sealing material.

(a) The main ingredient of a non-silicone type water repellent contained in the treatment agent is at least one of an aliphatic hydrocarbon having 20 carbon atoms or more and a higher alcohol having 18 carbon atoms or more.

(b) The main ingredient of the plasticizer contained in the treatment agent is at least one of carboxylic acid esters, polyester and epoxy type compound having 400 or more molecular weight.

(c) The main ingredient of the antioxidant contained in the treatment agent is a phenolic compound having 300 or more molecular weight.

(e) The main ingredient of the plasticizer contained in the sealing material is at least one of carboxylic acid esters, polyesters and epoxy type compounds having 400 or more molecular weight.

(f) The main ingredient of the antioxidant contained in the sealing material is a phenolic compound having 300 or more molecular weight.

(g) The main ingredient of the lubricant contained in the sealing material is at least one of an aliphatic hydrocarbon having 20 carbon atoms or more and a higher alcohol having 18 carbon atoms or more.

Further, the present invention provides a method of manufacturing an air filter which comprises selectively using the plasticizer and the antioxidant defined in (b), (c), (e) and (f) for the treatment agent and the sealing agent described above.

Now, if the main ingredient of the non-silicone type water repellent in (a) and the main ingredient of the lubricant in (g) are an aliphatic hydrocarbon having 19 carbon atoms or less and a higher alcohol having 17 carbon atoms or less, the gaseous substances are present in the clean room air being entrained by air passing through the air filter in a usual clean room, which is controlled at a temperature of 23° C. and at a humidity of 30–40% and in which the flow rate of air passing through the air filter is about 0.3 to 0.4 m/s, but such gaseous substances are not present in the clean room air when an aliphatic hydrocarbon having 20 carbon atoms or more and a higher alcohol 18 having carbon atoms or more is used.

Further, if the main ingredient of the plasticizer in (b) and (e) is dibutyl phthalate (molecular weight 278), dioctyl phthalate (molecular weight 391) or di-2-ethylhexyl adipate (molecular weight 371) having 400 or more molecular weight, the gaseous substances are present in the clean room air being entrained by air passing through the air filter in the usual clean room, but the gaseous substances are not present in the clean room air if those having 400 or more molecular weight are used.

Further, if the main ingredient of the antioxidant in (c) and (f) is 2,6-di-t-butyl-p-cresol (molecular weight 220.4) having 300 or more molecular weight, the gaseous substances are present in the clean room air being entrained by air passing through the air filter in the usual clean room, but the gaseous substances are not present in the clean room air if those having 400 or more molecular weight are used.

As actual examples of (a) and (g), there can be mentioned at least one of microcrystalline wax, natural wax, synthesis paraffin, polyolefin wax, branched alcohol of 18, 20 and 24 carbon number and oleyl alcohol.

As actual examples of (b) and (e), there can be mentioned isononyl phthalate (molecular weight: 418), octyldecyl phthalate (molecular weight: 419), diisodecyl phthalate (molecular weight: 447), lauryl phthalate (molecular weight: 501), myristylyl phthalate (molecular weight: 530), di-2-ethylhexyl azelate (molecular weight: 413), di-2-ethylhexyl sebacate (molecular weight: 427), tris-2-ethylhexyl trimellitate (molecular weight: 547), trioctyl trimellitate (molecular weight: 547), trinonyl trimellitate (molecular weight: 570), tridecyl trimellitate (molecular weight: 612), polyesters obtained by polycondensation of adipic acid, azelaic acid, sebacic acid or phthalic acid and glycol or glycerine (molecular weight: 2,000–8,000), epoxy fatty acid ester (molecular weight: 400–500) and epoxidized oil (molecular weight about 1,000).

As actual examples of (c) and (f), there can be mentioned stearyl-β-(3,5-di-t-butyl-4-hydroxyphenyl) propionate (molecular weight: 520.9), 2,2'-methylene-bis (4-methyl-6-t-butylphenol) (molecular weight: 340.5), 2,2'-methylene-bis (4-ethyl-6-t-butylphenol) (molecular weight 368.54), 4,4'-thiobis (3-methyl-6-t-butylphenol) (molecular weight: 358.5), 4,4'-butylidene-bis (3-methyl-6-t-butyl-phenol) (molecular weight: 382.6), 1,1,3-tris (2-methyl-4-hydroxy-5-t-butylphenyl) butane (molecular weight: 544.8), 1,3,5-trimethyl-2,4,6-tris (3,5-di-t-butyl-4-hydroxybenzyl) benzene (molecular weight: 775.2), tetrakis (methylene-3-(3', 5'-di-t-butyl-4'-hydroxyphenyl) propionate methane (molecular weight: 1177.7), bis (3,3'--bis (4'-hydroxy-3'-t-butylphenyl) butiric acid) glycol ester (molecular weight: 1177.7) and tocophenol (molecular weight: 794.4).

Further, the present inventors have found that as the molecular weight of the organic substance is greater, the volatility is lowered and the adsorption property is increased, but the adsorption amount to the silicon wafer is decreased and restricted if the molecular weight increases to more than a predetermined amount and that the predetermined amount is different depending on the molecular structure, and definitions for the numerical values in (a)–(c) and (e)–(g) described above were determined based on the result of experiment conducted for a number of targeted materials respectively.

The air filter according to the present invention may be such one as satisfying at least one of the definitions (a)–(c) and (e)–(g) described above, but those satisfying all of them are preferred since no gaseous organic substances are not released from all of the constituent materials of the air filter.

Specifically, preferred are those in which the main ingredient of the non-silicone type water repellent is microcrystalline wax, the main ingredient of the plasticizer contained in the non-silicone series water repellent is tri-2-ethylhexyl trimellitate, the main ingredient of the antioxidant contained in the non-silicone type water repellent is 2,2'-methylene-bis (4-ethyl-6-t-butylphenol), the main ingredient of the plasticizer contained in the sealing material is di-2-ethylhexyl sebacate, the main ingredient of the antioxidant contained in the sealing material is 2,2'-methylene-bis (4-ethyl-6-t-butylphenol) and the main ingredient of the lubricant contained in the sealing material is synthesis paraffin.

Further, the present invention provides an air filter which satisfies at least one of the definitions (a)–(c) and (e)–(d) described above, in which the main ingredient of the sealing material is a two component polyurethane resin formed by reaction between a main agent comprising a polyisocyanate and a curing agent, and the equivalent amount of active hydrogen in the curing agent is more than the equivalent amount of the isocyanate as the main agent and which contains no phosphoric acid ester. In the air filter, since the isocyanates of the main agent do not remain after the curing reaction of the sealing material, isocyanates and diamines caused by reaction of the isocyanate with water in the air are not formed, and since phosphoric acid ester is not released, release of gaseous organic substances from the sealing material is further suppressed.

The present invention further provides an air filter which satisfies at least one of the definitions (a)–(c) and (e)–(g) described above and in which the main ingredient for the sealing material is a two component epoxy resin formed by the reaction between the main ingredient and the curing agent, and the curing agent is acidic or neutral. In the air filter, since a basic amine compound as the curing agent of the sealing material is not contained in the air filter, release of the gaseous organic substances from the sealing material is further suppressed.

The present invention further provides an air filter which satisfies at least one of the definitions (a)–(c) and (e)–(g) described above and in which the main ingredient of the sealing material is a two component epoxy resin formed by the reaction between the main agent and the curing agent is of an amine type and the residual amine is reduced. As the means for reducing the residual amine, there can be mentioned blending and curing such that the amine equivalent is slightly lower than the epoxy equivalent thereby leaving no residual amine after curing, or heating of the resin after curing thereby volatiling the residual amine.

Further, the present invention provides an air filter which satisfies at least one of the definitions (a)–(c) and (e)–(g) described above and in which the filter medium is formed into a cloth-like shape by treating silicone-oil deposited glass fibers with a treatment agent and the silicone oil does not contain cyclosiloxanes having 10 silicon atom or less. Since-cyclosiloxanes having 10 silicon atoms or less are adsorbed extremely easily to the silicon wafer, this filter is suitable, particularly, to an air filter used for a clean room for use in semiconductor production.

Further, the present invention provides a method of manufacturing an air filter including a first step of depositing an silicone oil to glass fibers and a second step of treating the glass fibers with a treatment agent after the first step thereby forming a cloth-like filter medium, which comprises subjecting the glass fibers after the first step to a heat treatment in a clean air stream, thereby sufficiently removing siloxanes having 10 silicon atoms or less from the silicone oil deposited to the glass fibers and then applying a treatment by a treatment agent not releasing gaseous organic substances.

This is one of methods for manufacturing the air filter, in which siloxanes having 10 silicon atoms or less contained in the silicone oil can be removed sufficiently by putting the glass fibers deposited with the silicon oil in a tightly closed vessel and heating, for example, at 120° C. for several hours.

Further, the present invention provides a method of manufacturing an air filter including a first step of depositing a silicon oil to glass filters and a second step of treating the glass fibers with a treatment agent, after the first step into a cloth-like filter medium which comprises using those removed with cyclosiloxane having 10 silicon atoms or less as the silicone oil used in the first step and treating them by a treatment agent not forming gaseous organic substances.

This is one of methods for manufacturing the air filter, and siloxanes having 10 silicon atoms or less contained in the silicone oil can be eliminated sufficiently by removing low boiling ingredients by heating, for example, at 200° C. in a vacuum state (for example, at vacuum degree of 5 mHg).

Further, the present invention provides a clean room equipped one of air filters each described above.

Further, the present invention provides a local facility equipped with one of air filters each described above. The local facility means, for example, a clean booth disposed to a place where cleanness is intended to be increased locally, or a production facility requiring a predetermined cleanness, for example, a semiconductor production apparatus.

Further, the present invention provides a clean room, in which walls and floors are fabricated with building materials releasing gaseous organic substances in an amount of 50 $\mu$g per 1 g or less measured by a purge & trap method, and one of the air filters described above is attached by interposing, between the air filter and an opening used for attachment, a gasket not releasing gaseous organic substances in an amount of 50 $\mu$g per 1 g or less measured by the purge & trap method.

When the walls and the floors of the clean room and the gaskets for attaching the air filters are constituted with materials releasing gaseous organic substances in an amount of 50 $\mu$g per 1 g or less measured by the purge & trap method, the clean room can be reliably put to a state in which the organic substances are not released in a usual operation state.

If the clean room is used, for example, in a semiconductor production factory, it is possible that the organic substances are scarcely adsorbed to the silicone wafer.

The purge & trap method is a method of passing an inert gas at a predetermined temperature (a temperature at which all the organic ingredients can be volatile) to a predetermined amount of a material, evaporating all the gaseous organic ingredients contained in the specimen, trapping them and quantitatively determining the amount of the gaseous organic substances released from the trapped ingredient.

For the wall materials among the building materials releasing the gaseous organic substances in an amount of 50 $\mu$g per 1 g or less, a method of dry sealing a partition system by a fire proof material previously proposed by the present applicant (refer to Patent Laid-Open Sho 62-86248, Utility Model Laid-Open Sho 62-56614 and Utility Model Laid-Open Sho 62-124102) can be adopted and the surface material of the free access floor may be made of inorganic material such as stainless steel for the floor material. The amount of gaseous organic substances released from the wall materials and the floor materials is about 1.0 $\mu$g per 1 g.

Further, the present invention provides a treatment agent for impregnation into fibers in order to form the fibers into a cloth-like shape as a filter medium used for the air filter, which satisfies one of the definitions (a)–(c) described above. The treatment agent can suppress the amount of gaseous organic substances released from the air filter manufactured by using them.

As the treatment agent, those satisfying all the definitions (a)–(c) described above are preferred since gaseous organic substances are not released from the main constituent materials.

Further, the present invention provides a method of manufacturing a filter medium which selectively uses those defined with (b), (c) described above as the plasticizer and the antioxidant contained in the treatment agent impregnated in the filter medium. According to this method, a filter medium with less releasing amount of the gaseous organic substances can be manufactured.

The present inventors have further found that the presence of the phosphorus compounds or boron compounds in the clean room is attributable to organic phosphorus compounds (phosphoric esters) contained in the sealing material tightly sealing a portion between the filter medium and the frame of the air filter, and surface material for walls and floors for the phosphorus compounds and attributable to boron oxides contained in glass fibers as the filter medium of the air filter for the boron compounds.

From the findings described above, the present invention provides a clean room in which at least the surface material of the walls and the floors, the filter medium of the air filter and the sealing material for tightly sealing the portion between the filter medium and the frame are formed of such a material as not releasing organic phosphorus compounds and boron compounds into the air.

Further, the present invention provides a clean room in which the material releases gaseous organic phosphor compounds in an amount of 10 $\mu$g or less per 1 g of the material by the purge & trap method and leaches boron compounds in an amount of 20 $\mu$g or less per 1 g of the material after immersing in ultra-pure water for 28 days.

As described above, even when the constituent materials for the clean room are formed of a material containing the organic phosphorus compounds and the boron compounds, if the amount of the gaseous organic phosphorus compounds released from the constituent material is reduced to 10 μg or less per 1 g by the purge & trap method, and the boron compounds leached after immersion in ultra-pure water for 28 days is reduced to 20 μg or less per 1 g, it is possible that the organic phosphorus compounds and the boron compounds are not present in the clean room air when the clean room is operated in a usual state (at a temperature of 23° C., humidity of 30–40% and a flow rate of air passing the air filter of 0.3–0.4 m/s).

Further, the present invention provides a clean room in which the sealing material Is a polyurethane resin type sealing material containing diphenyl methane diisocyanate as a diisocyanate constituting the main ingredient thereof and, when a phosphoric acid ester is contained as a liquefying agent therefor, the molecular weight of the phosphoric acid ester is determined as 300 or more.

In conventional clean rooms, phosphoric acid esters are used as the liquefying agent for the polyurethane resin type sealing material containing diphenyl methane diisocyanate (additive for making diphenyl methane diisocyanate at high purity into a liquid state at a normal temperature) and as a plasticizer or a flame retardant for the vinyl chloride resin type sheet as the surface material for the walls and the floors. Among them, while the carboxylic acid or the like having 400 or more molecular weight shown in (e) described above can be used instead of the phosphoric acid, and aluminum hydroxide, antimony trioxide or the like can be used instead of the phosphoric acid ester for the flame retardant, but there is no substitute for the phosphoric acid ester as the liquefying agent.

Then, If the phosphoric acid ester used is triethyl phosphate (molecular weight 182), tributyl phosphate (molecular weight 266) and tris (β-chloroethyl) phosphate (molecular weight 285) having 300 or less molecular weight, gaseous substances of them are entrained by air passing through the air filter and present in the clean room air in the usual clean rooms described above, but when those having 300 or more molecular weight are used, gaseous substances of them are not present in the clean room air.

Accordingly, it is possible that the phosphoric acid ester is not present the clean room air by using a phosphoric acid ester having 300 or more molecular weight as the liquefying agent and by using the substitute described above or a phosphoric acid ester having 300 or more molecular weight for the plasticizer and the flame retardant.

Further, the present invention provides a clean room in which the phosphoric acid ester used as the liquefying agent is at least one of the substances shown in (h) below. (h) tri-2-ethylhexyl phosphate (molecular weight 435), tributoxyethyl phosphate (molecular weight 398), trioleyl phosphate (molecular weight 849), triphenyl phosphate (molecular weight 326), tricresol phosphate (molecular weight 368), trixylenyl phosphate (molecular weight 410), cresyl phenyl phosphate (molecular weight 340), xylenyl diphenyl phosphate (molecular weight 354), 2-ethylhexyl diphenyl phosphate (molecular weight 362), condensed aromatic phosphoric acid ester (molecular weight not less than 400), trisitridecyl)phosphite (molecular weight 629) and triphenyl phosphite (molecular weight 310).

Further, the present invention provides a local facility in which at least the surface material for the walls, the filter medium for the air filter and the sealing material tightly sealing a portion between the filter medium and the frame are formed of a material not releasing organic phosphorus compounds and boron compounds in the air.

Further, the present invention provides a local facility in which the material releases gaseous organic phosphorus compounds in an amount of 10 μg or less per 1 g of the material by the purge & trap method, and leaches the boron compound in an amount of 20 μg or less per 1 g of the material after immersing in ultra-pure water for 28 days.

Further, the present invention provides a local facility in which the sealing material is a polyurethane resin type sealing material, and contains diphenyl methane diisocyanate as a dIisocyanate constituting the main ingredient thereof and, when the phosphoric acid ester is contained as the liquefying agent therefor, the molecular weight of the phosphoric acid ester is 300 or more.

Further, the present invention provides a local facility in which the phosphoric acid ester used as the liquefying agent is at least one of the substances shown in (h).

As described above also in the local facility, it is possible that the gaseous organic phosphorus compounds or boron compounds are not present in the air at the inside of the local facility by constituting the wall material and the air filter in the same manner as in the case of the clean room.

Accordingly, the clean room and the local facility are particularly suitable to the production of semiconductors.

BEST MODE FOR PRACTICING THE INVENTION

The air filter according to the present invention is manufactured in the same manner as conventional air filters for use in clean rooms, by treating glass fibers or organic fibers such as of polytetrafluoro ethylene with a treatment agent containing, for example, a binder made, of an acrylic resin or the like, a non-silicone type water repellent, a plasticizer and an antioxidant thereby forming a cloth-like filter medium, putting the filter medium into a frame of a predetermined size and tightly sealing a portion between the frame and the filtration medium with a sealing material, in which those not forming gaseous organic substances during use of the clean room are selected and used as the treatment agent and the sealing material. Specifically, the treatment agent is adapted to satisfy the above definitions (a)–(c), while the sealing material is adapted to satisfy the above definitions (e)–(g).

Further, when the fibers for the filter medium are glass fibers, a silicone oil not containing cyclosiloxanes having 10 silicone atoms or less is used, or glass fibers coated with a silicone oil are subjected to a heat treatment in a clean air stream, to remove cyclosiloxanes having 10 silicon atoms or less, so that cyclosiloxanes having 10 silicone atoms or less are not contained in the filter medium.

Further, in order that the phosphorus compounds and the boron compounds are not present in the clean room and the local facility, at least the surface material for the walls and the floors (only for the walls in the local facility not equipped with floors), the filter medium for the air filter and the sealing material for tightly sealing a portion between the filter medium and the frame are formed of a material not releasing the organic phosphorus compounds and the boron compounds in the air. Specifically, as the materials described above, those releasing gaseous organic phosphorus compounds in an amount of 10 μg or less per 1 g of the material by the purge & trap method and leaching the boron compounds in an amount of 20 μg or less per 1 g of the material after immersing in super-purified water for 28 days are used.

Details for the mode of practicing the present invention will be explained below referring to concrete examples.

EXAMPLE 1

In Nos. 1–5 and 7–12, air filters were manufactured by using glass fibers or fluoro-fibers as the filter medium, in which the non-silicone type water repellent, the plasticizer and the antioxidant contained in the treatment agent, the main ingredient for the sealing material and the plasticizer and the antioxidant contained in the sealing material had constitutions shown in the following Tables 1 to 3. In No. 6, commercially available ULPA filters were used as they were, and the ingredients for each of the constituent materials were analyzed and examined by the following analyzing method.

Abbreviations in each of the tables show the following substances.

K1: Di-2-ethylhexyl sebacate
S1: Stearyl-,β-(3,5-di-t-butyl-4-hydroxyphenyl) propionate
K2: Diisodecyl phthalate
S2: 2,2'-methylene-bis (4-ethyl-6-t-butylphenol)
K3: Tris-2-ethylhexyl trimellitate
S3: 1,1,3-tris (2-methyl-4-hydroxy-5-t-butylphenyl) butane
K4: 1,3-butylene glycol adipate
S4: 2,6-di-t-butyl-p-cresol
K5: Dioctyl phthalate
S5: 2,6-di-t-butyl-4-ethylphenol
K6: Dibutyl phthalate
K7: Dibutyl adipate Fiber for Filter Medium In Nos. 1–5, glass fibers for use in commercially available ULPA filters (coated with a silicone oil upon spinning) removed with siloxanes having 10 silicon atoms or less by heating in a clean air stream at 120° C. for 6 hours were used. When 400 mg of the glass fibers were analyzed by the following P&T (dynamic headspace)-GC/MS method, siloxane having 10 silicon atoms or less contained in the glass fibers were less than the detection limit value by the analyzing method.

In Nos. 6–9, glass fibers for use in commercial ULPA filters (coated with a silicone oil upon spinning) were used as they were.

In No. 10, silicone oil KF99 manufactured by Shinetsu Chemical Industry Co. was charged in a vacuum distillation device, and kept at 200° C. at a vacuum degree of 5 mHg to remove low boiling ingredients, by which the siloxanes having 10 silicon atoms or less contained in the silicone oil were removed sufficiently to less than the detection limit value by the analysis using the following P&T-GC/MS method. In the analysis, quartz fibers deposited with several mg of a silicone oil after vacuum distillation were used as the specimen. Then, glass fibers obtained by coating the silicone oil not containing siloxanes having 10 silicon atoms or less as the reinforcing material upon spinning were used as the fibers for the filter medium.

In Nos. 11 and 12, fluoro-fibers (polytetrafluoroethylene: PTFE) were used as the fibers for the filter medium. The fibers are not coated with the silicone oil.

<P&T (Purge & Trap: Dynamic Headspace Method)-GC/MS Method>

A predetermined amount of the specimen is filled in a test tube, the test tube is heated at 150° C. for 30 min while flowing a helium gas to the inside, volatile ingredients are trapped in a trap tube cooled to −80° C., and the ingredients in the trap tube are heated rapidly to 300° C. under a helium gas stream into a gaseous state, which are introduced into a GC/MS device.

The GC device is HP-5890A manufactured by Hewlett-Packard Co. and the MS device is HP-5970B of the same company. The column for the GC device is HP-ULTRA 2 (OV-5 system) of the same company having 0.2 mm inner diameter, 25 mm length and 0.33 μm thickness. The temperature condition upon measurement by the GC device is as follows.

Initial temperature 40° C.→temperature elevation at a rate of 10° C./min→final temperature 280° C. (kept for 15 min). Further, the carrier gas in the GC device is helium, the injection method is a split method, and a split ratio is 1/200. The ionization method for the MS device is an electron impact method and the detection range is 25 to 1000 at m/z.

The quantitative analysis is conducted by preparing a calibration line for an organic substance identified on every peak for each of the ingredients or, if plurality of peaks appear, all ingredients are indicated using n-decane as a reference substance by the concentration converted based on n-decane as a standard according to a calibration curve thereof. Thus, the content and the kind of the volatile organic materials in the specimen are measured.

Treating Agent

In Nos. 1–5 and 7–12, the non-silicone type water repellent, the plasticizer and the antioxidant shown in each of the tables were blended at each of the ratios on every samples (values based on 100 parts by weight of the water repellent are indicated as parts by weight in () in each of the tables), which are dissolved in a 1:1 solvent mixture of acetone and toluene and incorporated with a predetermined amount of an acrylic resin binder, the solution was impregnated into glass fibers spread and overlaid into a sheet-like web of a predetermined size and then dried to prepare a cloth-like filter medium. About 1 g of the non-silicone type water repellent was used for the filter medium for one unit of the filter.

Sealing Material

Sealing materials were manufactured by blending, the main ingredients for the sealing materials (main agent and curing agent) and plasticizers (plus antioxidant and lubricant in Nos. 1, 2, 6 to 8, 10, 11) shown in each of the tables at each of ratios (values based on 100 parts by weight of the main ingredient are indicated as parts by weight in () in each of the tables) on every samples and the filter medium was placed and tightly sealed in an aluminum frame (600 mm×600 mm×100 mm, one-half size of commercial product) by using the sealing material to prepare air filters.

In Nos. 1 and 2 using the polyurethane type sealing material, the curing agent and the main ingredient (diisocyanate comprising methylene diphenyl diisocyanate as the main ingredient) were mixed as such a blending ratio that the equivalent amount of active hydrogen in the former is greater than the equivalent amount of the isocyanate group in the latter.

Further, an amine type curing agent was used for No. 4, and a treatment of removing volatile organic substances (mainly amines remaining after curing) was conducted by winding a ribbon heater. around the frame after curing and heating at about 130° C. for 4 hours.

For each of the sealing materials, the releasing amount of the organic substances was measured by using a portion cutout therefrom three days after curing (several tens milligram) and by the analysis by the P&T(Dynamic headspace)-GC/MS method described above. The results are also shown collectively in each of the tables. For No. 4, the measurement was conducted to the sealing material after the treatment of removing the organic substances described above.

Performance Test for Air Filter: Measurement for Dust Removing Efficiency

For the thus manufactured air filter, particles of dioctyl phthalate (DOP) were blown at a blow rate of 5.3 cm/sec to the entire surface on one side, the number of DOP particles contained in the air near the filter medium surface on the blown side (number of particles at the inlet) and the number of DOP particles contained in the air in the vicinity of the filter medium surface on the opposite side (number of particles at the exit) are counted by a particle counter respectively and it is judged as satisfactory if the number of particles at the exit is 100 n/ft$^3$ or less for the number of particles at the inlet of 10$^7$ n/ft$^3$ (that is, if the removing efficiency is 99.999% or higher). The efficiency for removing dusts for each of the air filters measured by this method, which is referred to as "COLD DOP Method", is shown in each of the tables.

Gasket

Each of the thus obtained air filters was attached to a frame of a blower filter unit by way of the gasket shown in each of the tables respectively. Further, the releasing amount of the organic substances was also measured for the gasket by using a portion cutout therefrom. The results are also shown collectively in each of the tables.

The gasket used is as shown below. G1 was formed by mixing the main agent and the curing agent of the main ingredient, the plasticizer, the antioxidant and the lubricant and cast molding them. Further, G2–G4 were formed by heat-kneading the rubber material as the main ingredient, the plasticizer, the antioxidant and the lubricant and extrusion molding them by an extrusion molder. For G5 and G6, commercial products were used as they were.

| < G1 (Urethane Rubber Type (1)) > | |
|---|---|
| Main ingredient: | Two components polyurethane manufactured by Nippon Polyurethane Industry Co. |
| Main agent: | PURE MDI (trade name of products), |
| Curing agent: | polyol |
| Plasticizer: | Di-2-ethylhexyl sebacata |
| Antioxidant: | Stearyl-β-(3,5-di-t-butyl-4-hydroxyphenyl) propionate |
| Lubricant: | Microcrystalline wax (number of carbon atoms, 30 - about 50) |
| < G2 (Vinyl Chloride Rubber Type) > | |
| Main ingredient: | vinyl chloride rubber manufactured by Nippon Zeon Co. |
| Plasticizer: | Chlorinated paraffin |
| Antioxidant: | 2,2'-methylene-bis (4-ethyl-6-t-butylphenol) |
| Lubricant: | Microcrystalline wax (number of carbon atoms, 34 - about 50) |
| < G3 (Butyl Rubber Type) > | |
| Main ingredient: | Butyl rubber manufactured by Asahi Sangyo Co. |
| Plasticizer: | 1,3-butylene glycol adipate |
| Antioxidant: | 1,1,3-tris (2-methyl-4-hydroxy-5-t-butylphenyl) butane |
| Lubricant: | Microcrystalline wax (number of carbon atoms, 34 - about 50) |
| < G4 (Chloroprene Rubber Type) > | |
| Main ingredient: | Neoprene Rubber manufactured by Toso Co. |
| Plasticizer: | 1,3-butylene glycol adipate |
| Antioxidant: | 1,1,3-tris (2-methyl-4-hydroxy-5-t-butylphenyl) butane |
| Lubricant: | Microcrystalline wax (number of carbon atoms, 34 about 50) |
| < G5 (Urethane Rubber Type (2)) > | |
| Gasket using liquid MDI, manufactured by Nippon Polyurethane Rubber Industry Co. | |

-continued

| < G8 (Urethane Rubber Type (3)) > |
|---|
| Gasket using liquid MDI, manufactured by Nippon Polyurethane Rubber Industry Co. (Clean Room) |

Clean rooms were fabricated by using each of the blower filter units, forming wall materials by dry-sealing of partitions finished by bake coating, and forming floor materials by using stainless steel sheets as the surface material of a free access floor. The amount of organic substances released was 0.1 μg/g or less both for the wall materials and the floor materials according to the analysis by the P&T-(Dynamic headspace) method described above. After 3 days operation of the clean rooms, silicon wafers of 6 inch diameter were placed and left for 6 hours in it, and the amount and the kind of the organic substances adsorbed on the wafer were analyzed by using the-following SWA device. The results are also shown collectively in each of the tables.

<Analysis by SWA Device>

The SWA device is a silicon wafer analyzer (trade name of products) manufactured by G. L. Science Co. having the following trap device, TCT (Thermal Desorption Cold Trap Injector) device, and GC/MS device. The trap device is adapted to desorb materials adsorbed on the surface of a wafer and collect desorbed ingredients. The TCT device is adapted to heat the ingredients collected by the trap device to 300° C. in a helium gas stream, then introduce them into a capillary tube cooled to −130° C. by liquid nitrogen and collect them under cooling. The ingredients collected by the TCT device are rapidly heated to 300° C. in a helium gas stream and introduced into the GC/MS device.

Referring to the GC/MS device used herein, the GC device is HP-5890A and MS devices is HP-5971A. HP-5 (25 mm length, 0.2 mm inner diameter, 0.33 μm film thickness) is used for the column of the GC device and temperature condition upon measurement by the GC device is as follows.

Initial temperature 80° C. (kept for 10 min)→temperature elevation at a rate of 7° C./min→final temperature 300° C. (kept for 10 min).

Other procedures than the above are identical with those in the P&T (Dynamic headspace)-GC/MS method, by which the content and the kind of the organic substances adsorbed on the wafer surface are measured. According to this method, analysis is possible to the order of several ng (10$^{-9}$ g) per one wafer.

As can be seen from the results, in Nos. 1–5 and Nos. 10 and 11 corresponding to each of the embodiments of the present invention, gaseous organic substances present in the clean room can be reduced and the amount of the organic substances adsorbed to the silicon wafer placed in the clean room can be reduced to less than 1/10 compared with the case of a conventional ULPA filter (No. 6) or a filter using a plasticizers and antioxidants, etc. of lower molecular weight (Nos. 7–9, 12). Also, the dust removing efficiency dusts is higher than 99.999%, which does not deteriorate the performance as the air filter.

EXAMPLE 2

As the floor material, the wall material, the filter medium of the air filter (prefilter: for external air intake port, main filter for clean air blown out port), and the sealing material for securing the filter medium and the frame of the air filter, the following materials were used in the combination shown in Tables 4 and 5 to fabricate each of clean rooms. The size (inner size) of each clean room was 6,000×7,200×3,700 mm.

Floor Material

A vinyl chloride laying sheet (1) (2.0 mm thickness) was prepared by adding an epoxidized soybean oil as a plasticizer, stearyl-β-(3,5-di-t-butyl-4-hydroxyphenyl) propionate as an antioxidant, aluminum hydroxide as a flame retardant and stearyl amide ethylene oxide adduct as an antistatic agent to a polyvinyl chloride resin. A vinyl chloride laying sheet (2) (2.0 mm thickness) is a commercially available product (antistatic FLOORLIUM, manufactured by Tori Co.).

A floor for a clean room was formed by appending either one of the vinyl chloride sheets or a commercially available stainless steel sheet to a free access floor made of aluminum.

Wall material

A vinyl chloride cloth (1) (0.28 mm thickness) was prepared by adding 1-3-butylene glycol adipate as a plasticizer, 2,2-methylene-bis(4-methyl-6-t-butyl phenyl) as antioxidant, antimony trioxide as a flame retardant and stearyl amide ethylene oxide adduct as an antistatic agent to a polyvinyl chloride resin. A vinyl chloride cloth(2) (1.0 mm thickness) is a commercially available product (SG 1533 manufactured by Sangetsu Co.).

Walls for the clean room were constituted by appending either one of the vinyl chloride clothes to the wall surface, or disposing a partition for use in a clean room manufactured by COMMANY Co. (partition made of a steel sheet applied with bake coating at the surface).

Air filter

As a filter medium for use in prefilters (P.F) and main filer (ULPA filter: U.F), three kinds of glass fiber filter mediums (1)–(3) of different chemical compositions, filter medium made of polyester fibers and filter medium made of fluorofibers (PTFE fibers) were provided.

As the sealing material for securing the filter medium to the frame, polyurethane resin type sealing materials (1) and (2) and an epoxy resin type sealing material were provided. The polyurethane type sealing materials (1) and (2) are two component sealing material containing pure MDI 4,4'-Methylene (phenyl isocyanate) diisocyanate at high purity, manufactured by Nippon Polyurethane Industry Co.) as the main agent, and trioleyl phosphate was blended to the sealing material (1) and tributyl phosphate was blended to the sealing material (2) each by 0.3% by weight as the liquefying agent for MDI, other compositions being identical with those of the sealing materials (1) and (2).

A frame made of aluminum and having an inner size of 600×1200×100 was used.

The ULPA filter was attached to an opening of a clean room ceiling not using a gasket after the complete cure of the sealing material, while the prefilter was attached to an external air intake port of a duct directing to the ceiling after complete cure of the sealing material.

Method of Analyzing each of Constituent Materials

Each of the surface materials of the floor material and the wall material, the filter medium and the sealing material for the air filter (three days after curing for the sealing material) used was cut out by a predetermined amount, subjected to qualitative analysis for organic substances and quantitative analysis for organic phosphorous compounds by the P&T-GC/MS method shown in Example 1, and the boron content was analyzed by the following method. The detection limit value of the quantitative analysis for the organic phosphorous compound by the method described above is 1.0 μg/g.

Method of Analyzing Boron Content

A cut out specimen was immersed in a predetermined amount of ultra-pure water (specific resistivity of higher than 18.6 MΩ) for 28 days, the ultra-pure water was introduced into an ICP/MS device (model HP-4500 of Hewlett Packard Co.), inorganic substances leached out in the ultra-pure water were analyzed and the content of boron was determined quantitatively by using a calibration curve prepared for an aqueous boric acid at a known concentration. The detection limit value for the quantitative analysis by the method is 0.1 μg/g.

Evaluation of Clean Room

In each of the clean rooms, external air (fresh air) passing the prefilters and return air from the inside of the clean room were mixed and sent to a chamber at the back of the ceiling, and then passed through the ULPA filters at the ceiling and supplied into the clean room, in which the mixing ratio between the return air and the fresh air was set to 10:1. Then, each of the clean rooms was operated continuously for two weeks at an air flow rate at the exit from the ULPA filter to 0.40 m/s, at a temperature of 23° C. and at a relative humidity of 40%, in an unattended state with nothing being placed at the inside and, subsequently, air in each of the clean rooms was taken out to analyze organic substances and inorganic substances contained in the air.

For the analysis of the organic substances, 40 liter of air in the clean room were introduced into a TENAX tube (trade name of Chromepack Co.) thereby adsorbing organic ingredients contained in the air. Then, the TENAX tube was installed to a TCT device (refer to Example 1), the organic ingredients adsorbed to the TENAX tube were taken out by the TCT device, heated and then introduced into the GC/MS device. The detection limit value for the quantitative analysis by this method is 10 ng/m$^3$.

Inorganic substances were analyzed by introducing air in the clean room at a flow rate of 10 liter per min for 24 hours into an impinger containing 200 ml of ultra-pure water (specific resistivity of higher than 18.6 MΩ), leaching the inorganic ingredients contained in the air into the ultra-pure water, and introducing the ultra-pure water into the ICP/MS device (model HP-4500 of Hewlett Packard Co.). The detection limit value for the quantitative analysis by this method is 20 ng/m$^3$.

The results for each of the analyses are also shown collectively in Tables 4 and 5.

As can be seen from the results, in the clean rooms of NOs. 21–24 corresponding to the embodiments of the present invention, analysis values for the organic phosphorus compounds and the boron compounds in the clean room air are below the detection limit values. Since the organic phosphorous compounds and the boron compounds are not present in the air at the inside of the clean rooms, such clean rooms are particularly suitable as those used for semiconductor production. On the contrary, the clean rooms Nos. 25–28 corresponding to the comparative examples of the present invention are not preferred since either the organic phosphorus compounds or the boron compounds are present in the clean room air, and there is a worry of causing unnecessary doping as the clean room for semiconductor production.

In this Example 2, the ULPA filter is attached to the opening of the clean room ceiling without using the gasket.

When an urethane rubber type gasket is used, it is desirable to use a phosphoric acid ester having 300 or more molecular weight as the liquefying material for diphenyl methane isocyanate, like that in the sealing material for securing the filter medium to the frame.

EXAMPLE 3

The wall material, the filter medium for the air filter (ULPA filter) and the sealing material for securing the filter medium and the frame of the air filter were used in the combination shown in Table 6 to fabricate each of local facilities for use in semiconductor production apparatus. Each of the constituent materials was analyzed in the same manner as in Example 2.

Then, each of the local facilities was placed in No. 21 clean room in Example 2 and air in the clean room (fresh air and return air mixed and passed through the ULPA filter in the clean room) was introduced into the ULPA filter of the local facility for Nos. 31 and 33. Further, for Nos. 32 and 34, only the fresh air was introduced into the ULPA filter of the local facility. In this way, after continuous two week operation of each of the local facilities in No. 21 clean room under the conditions described above, air in each of the local facilities was taken out and the organic substances and inorganic substances contained in the air were analyzed in the same manner as in Example 2.

The results for each analysis were also shown in Table 6.

As can be seen from the results, in the local facilities of Nos. 31 and 33 corresponding to the embodiments of the present invention, analysis values for the organic phosphorus compounds and the boron compounds in the air at the inside of the local facilities are below the detection limit values and, since the organic phosphorus compounds and the boron compounds are not present in the local facilities, such local facilities are particularly suitable as the local facility for use in semiconductor production. On the contrary, the local facilities of Nos. 32 and 34 corresponding to the comparative examples of the present invention are not desired, since either the organic phosphorus compounds or the boron compounds are present in the air at the inside of the local facilities and there if a worry of causing unnecessary doping for the local facility used in the semiconductor production.

Also in this Example 3, the ULPA filter is attached to the ceiling opening of the local facility without using gaskets. In a case of using urethane rubber type gaskets, it is desirable to use a phosphoric acid ester having 300 or more weight as the liquefying material for the diphenyl methane isocyanate like that in the sealing material for securing the filter medium to the frame.

TABLE 1

|  | No. 1 | No. 2 | No. 3 | No. 4 |
|---|---|---|---|---|
| Fiber | Glass fiber for ULPA filter | Glass fiber for ULPA filter | Glass fiber for ULPA filter | Glass fiber for ULPA filter |
| Silicone oil Treating agent | $Si_{10}$ or less siloxane removed | $Si_{10}$ or less siloxane removed | $Si_{10}$ or less siloxane removed | $Si_{10}$ or less siloxane removed |
| Water repellent agent (100) | Synthetic paraffin ($C_{20}$–$C_{28}$) | $C_{24}$ branched higher alcohol | Microcrystalline wax ($C_{34}$–$C_{50}$) | Polyoleffin wax ($C_{20}$–$C_{28}$) |
| Plasticizer | Epoxydized soybean oil (Mw = 1000) [7] | K2 (Mw = 447) [5] | K3 (Mw = 547) [7] | K4 (Mw = 2000–4000) [10] |
| Antioxidant Constitution of sealing material | S1 (Mw = 520.9) | S1 (Mw = 520.9) [2] | S2 (Mw = 368.54) [2] | S3 (Mw = 544.8) [4] |
| Main ingredient |  |  |  |  |
| Main agent | 4,4' Methylene (phenyl isocyanate) | 4,4' Methylene (phenyl isocyanate) | Epoxy resin (bisphenol type) | Epoxy resin (bisphenol type) |
| Curing agent | Polyol type | Polyol type | Acid anhydride (methylnadic acid) | Amine type (heat treated after curing) |
| Plasticizer | K1 (Mw = 427) [5] | K1 (Mw = 427) [5] | K4 (Mw = 2000–4000) [10] | Epoxidized soybean oil (Mw = 1000) [10] |
| Antioxidant Lubricant | S2 (Mw = 368.54) [3] Synthetic paraffin ($C_{20}$–$C_{28}$) [6] | S2 (Mw = 368.54) [3] Synthetic paraffin ($C_{20}$–$C_{28}$) [6] |  |  |
| Amount of organics released from sealing material (μg/g) | 4.5 | 4.5 | 8.2 | 7.5 |
| Kind of gasket | G1 (urethane rubber type) | Not used | G2 (vinyl chloride rubber type | G3 (butyl rubber type) |
| Amount of organics released from gasket (μg/g) | not more than 1 |  | 5.6 | 2.7 |

TABLE 1-continued

|  | No. 1 | No. 2 | No. 3 | No. 4 |
|---|---|---|---|---|
| Amount of organics adsorbed on wafer (ng/wafer) | 28 | 26 | 31 | 20 |
| Kind of organics adsorbed on wafer | Not identifiable because of each small peak | Not identifiable because of each small peak | Not identifiable because of each small peak | Not identifiable because of each small peak |
| Particle filtering efficiency | More than 99.999% | More than 99.999% | More than 99.999% | More than 99.999% |

TABLE 2

|  | No. 5 | No. 6 | No. 7 | No. 8 |
|---|---|---|---|---|
| Fiber | Glass fiber for ULPA filter | Glass fiber for ULPA filter | Glass fiber for ULPA filter | Glass fiber for ULPA filter |
| Silicone oil | $Si_{10}$ or less siloxane removed | $Si_3$–$Si_{10}$ siloxane contained | $Si_3$–$Si_{10}$ siloxane contained | $Si_3$–$Si_{10}$ siloxane contained |
| Treating agent |  |  |  |  |
| Water repellent agent [100] | Natural paraffin ($C_{22}$–$C_{30}$) | $C_9$–$C_{16}$ aliphatic hydrocarbon | Liquid paraffin ($C_{12}$–$C_{18}$) | Liquid paraffin ($C_{12}$–$C_{18}$) |
| Plasticizer | K1 (Mw = 427) [7] | K5 (Mw = 391) [7] | K5 (Mw = 391) [7] | K5 (Mw = 391) [7] |
| Antioxidant | S3 (Mw = 544.8) [3] | S4 (Mw = 220.4) [3] | S4 (Mw = 220.4) [2] | S5 (Mw = 234) [2] |
| Constitution of sealing material |  |  |  |  |
| Main ingredient |  |  |  |  |
| Main agent | Epoxy resin (bisphenol type) | 4,4' Methylene (phenyl isocyanate) | 4,4' Methylene (phenyl isocyanate) | 4,4' Methylene (phenyl isocyanate) |
| Curing agent | Acid anhydride | Polyol type | Polyol type + phosphate type | Polyol type + phosphate type |
| Plasticizer | K4 (Mw = 2000–4000) [10] | K6 (Mw = 278) [7] | K5 (Mw = 391) [7] | K5 (Mw = 391) [8] |
| Antioxidant |  |  |  |  |
| Lubricant |  | Tributylphosphate $C_9$–$C_{18}$ aliphatic hydrocarbon | Tributylphosphate Liquid paraffin ($C_{12}$–$C_{18}$) [6] | Tributylphosphate Liquid paraffin ($C_{12}$–$C_{18}$) [7] |
| Amount of organics released from sealing material (μg/g) | 8.3 | 2750 | 853 | 792 |
| Kind of gasket | G4 (chloroprene rubber type) | Urethane rubber type | G5 (urethane rubber type (2)) | Not used |
| Amount of organics released from gasket (μg/g) | 7.3 | 2630 | 185 | — |
| Amount of organics adsorbed on wafer (ng/wafer) | 35 | 653 | 586 | 537 |
| Kind of organics adsorbed on wafer | Not identifiable because of each small peak | $C_9$–$C_{16}$ aliphatic hydrocarbon $Si_3$–$Si_{10}$ siloxane K5, K6, S4 2-ethylhexanol | $C_{12}$–$C_{18}$ aliphatic hydrocarbon $Si_3$–$Si_{10}$ siloxane K5, K6, S4 Tributylphosphate 2-ethylhexanol | $C_{12}$–$C_{18}$ aliphatic hydrocarbon $Si_3$–$Si_{10}$ siloxane K5, K6, S4 Tributylphosphate 2-ethylhexanol |
| Particle filtering efficiency | More than 99.999% | More than 99.999% | More than 99.999% | More than 99.999% |

TABLE 3

|  | No. 9 | No. 10 | No. 11 | No. 12 |
|---|---|---|---|---|
| Fiber | Glass fiber for ULPA filter | Glass fiber | Fluoro fiber (PTFE) | Fluoro fiber (PTFE) |

TABLE 3-continued

|  | No. 9 | No. 10 | No. 11 | No. 12 |
|---|---|---|---|---|
| Silicone oil Treating agent | $Si_3$–$Si_{10}$ siloxane contained | $Si_{10}$ or less siloxane removed | Not used | Not used |
| Water repellent agent [100] | Liquid paraffin ($C_{12}$–$C_{18}$) | Synthetic paraffin ($C_{20}$–$C_{28}$) | Synthetic paraffin ($C_{20}$–$C_{28}$) | Liquid paraffin ($C_{12}$–$C_{18}$) |
| Plasticizer | K7 (Mw = 258) [7] | Epoxidized soybean oil [7] (Mw = 1000) | Epoxydized soybean oil [7] (Mw = 1000) | K5 (Mw = 391) [7] |
| Antioxidant | S4 (Mw = 220.4) [3] | S1 (Mw = 520.9) [3] | Si (Mw = 520.9) [3] | S4 (Mw = 220.4) [2] |
| Constitution of sealing material Main ingredient |  |  |  |  |
| Main agent | Epoxy resin (bisphenol type) | 4,4' Methylene (phenyl isocyante) | 4,4' Methylene (phenyl isocyante) | Epoxy resin (bisphenol type) |
| Curing agent | Amine type | Polyol type | Polyol type | Amine type |
| Plasticizer | K6 (Mw = 278) [10] | K1 (Mw = 427) [5] | K1 (Mw = 427) [5] | K6 (Mw = 278) [10] |
| Antioxidant |  | S2 (Mw = 368.54) [3] | S2 (Mw = 268.54) [3] |  |
| Lubricant |  | Synthetic paraffin ($C_{20}$–$C_{28}$) [6] | Synthetic paraffin ($C_{20}$–$C_{28}$) [6] |  |
| Amount of organics released from sealing material (μg/g) | 1360 | 5.3 | 5.6 | 584 |
| Kind of gasket | G6 (urethane rubber type (3)) | G1 (urethane rubber type (1)) | G1 (urethane rubber type (1)) | G6 (urethane rubber type (3)) |
| Amount of organics released from gasket (μg/g) | 168 | less than 1 | less than 1 | 168 |
| Amount of organics adsorbed on wafer (ng/wafer) | 820 | 25 | 18 | 483 |
| Kind of organics adsorbed on wafer | $C_{12}$–$C_{18}$ aliphatic hydrocarbon, $Si_3$–$So_{10}$ siloxane, K7, K6, S4 Triethylene tetramine Tributylphosphate | Not identifiable because of each small peak | Not identifiable because of each small peak | $C_9$–$C_{18}$ aliphatic hydrocarbon, K6, S4, Tributylphosphate |
| Particle filtering efficiency | More than 99.999% | More than 99.999% | More than 99.999% | More than 99.999% |

TABLE 4

|  | No. 21 | No. 22 | No. 23 | No. 24 |
|---|---|---|---|---|
| Clean Room constituent member Floor surface material |  |  |  |  |
| Material | Stainless steel sheet | Stainless steel sheet | Vinyl chloride sheet (1) | Vinyl chloride sheet (1) |
| Boron content (μg/g) | below detection limit value | below detection limit value | below detection limit value | below detection limit value |
| Organic phosphorus content (μg/g) | below detection limit value | below detection limit value | below detection limit value | below detection limit value |
| Wall surface material |  |  |  |  |
| Material | Coated steel plate | Coated steel plate | Vinyl chloride cloth (1) | Vinyl chloride cloth (1) |
| Boron content (μg/g) | below detection limit value | below detection limit value | below detection limit value | below detection limit value |
| Organic | below detection | below detection | below detection | below detection |

TABLE 4-continued

|  | No. 21 | No. 22 | No. 23 | No. 24 |
|---|---|---|---|---|
| phosphorus content (μg/g) | limit value | limit value | limit value | limit value |
| P.F filter medium |  |  |  |  |
| Material | Glass fiber (1) | Polyester fiber | Glass fiber (1) | Polyester fiber |
| Boron content (μg/g) | 15 | below detection limit value | 15 | below detection limit value |
| Organic phosphorus content (μg/g) | below detection limit value | below detection limit value | below detection limit value | below detection limit value |
| U.F filter medium |  |  |  |  |
| Material | Glass fiber (1) | Glass fiber (1) | Glass fiber (1) | PTFE fiber |
| Boron content (μg/g) | 15 | 15 | 15 | below detection limit value |
| Organic phosphorus content (μg/g) | below detection limit value | below detection limit value | below detection limit value | below detection limit value |
| sealing material |  |  |  |  |
| Material | Polyurethane resin type (1) | Polyurethane resin type (1) | Epoxy resin type | Epoxy resin type |
| Boron content (μg/g) | below detection limit value | below detection limit value | below detection limit value | below detection limit value |
| Organic phosphorus content (μg/g) | Trioleyl phosphate 15 | Trioleyl phosphate 15 | below detection limit value | below detection limit value |
| Boron content in clean room air (ng/m$^3$) | below detection limit value | below detection limit value | below detection limit value | below detection limit value |
| Organic phosphorus compound content in clean room air (ng/m$^3$) | below detection limit value | below detection limit value | below detection limit value | below detection limit value |

TABLE 5

|  | No. 25 | No. 26 | No. 27 | No. 28 |
|---|---|---|---|---|
| Clean Room constituent member |  |  |  |  |
| Floor surface material |  |  |  |  |
| Material | Stainless steel sheet | Stainless steel sheet | Stainless steel sheet | Vinyl chloride sheet (1) |
| Boron content (μg/g) | below detection limit value | below detection limit value | below detection limit value | below detection limit value |
| Organic phosphorus content (μg/g) | below detection limit value | below detection limit value | below detection limit value | Tris-(β-chloroethyl) phosphate 14 |
| Wall surface material |  |  |  |  |
| Material | Coated steel plate | Coated steel plate | Coated steel plate | Vinyl chloride cloth (2) |
| Boron content (μg/g) | below detection limit value | below detection limit value | below detection limit value | below detection limit value |
| Organic phosphorus content (μg/g) | below detection limit value | below detection limit value | below detection limit value | Tris-(β-chloroethyl) phosphate 20 |
| P.F filter medium |  |  |  |  |
| Material | Glass fiber (3) | Glass fiber (2) | Polyester fiber | Polyester fiber |
| Boron content (μg/g) | 52 | 24 | below detection limit value | below detection limit value |
| Organic phosphorus content (μg/g) | below detection limit value | below detection limit value | below detection limit value | below detection limit value |
| U.F filter medium |  |  |  |  |
| Material | Glass fiber (3) | Glass fiber (2) | Glass fiber (2) | PTFE fiber |
| Boron content (μg/g) | 52 | 24 | 24 | below detection limit value |

TABLE 5-continued

|  | No. 25 | No. 26 | No. 27 | No. 28 |
|---|---|---|---|---|
| Organic phorphorus content (μg/g) | below detection limit value | below detection limit value | below detection limit value | below detection limit value |
| sealing material |  |  |  |  |
| Material | Polyurethane resin type (2) | Polyurethane resin type (2) | Epoxy resin type | Epoxy resin type |
| Boron content (μg/g) | below detection limit value | below detection limit value | below detection limit value | below detection limit value |
| Organic phosphorus content (μg/g) | Tributyl phosphate 100 | Tributyl phosphate 100 | below detection limit value | below detection limit value |
| Boron content in clean room air | 120 | 70 | 32 | below detection limit value |
| Organic phosphorus compound content in clean room air | Tributyl phosphate 150 | tributyl phosphate 140 | below detection limit value | Tris-(β-chloroethyl) phosphate 250 |

TABLE 6

|  | No. 31 | No. 32 | No. 33 | No. 34 |
|---|---|---|---|---|
| Local facility constituent material |  |  |  |  |
| Wall material |  |  |  |  |
| Material | Coated steel plate | Stainless steel sheet | Coated steel plate | Stainless steel sheet |
| Boron content (μg/g) | below detection limit value | below detection limit value | below detection limit value | below detection limit value |
| Organic phorphorus content (μg/g) | below detection limit value | below detection limit value | below detection limit value | below detection limit value |
| U.F filter medium |  |  |  |  |
| Material | Glass fiber (1) | Glass fiber (1) | Glass fiber (3) | Glass fiber (3) |
| Boron content (μg/g) | 15 | 15 | 52 | 52 |
| Organic phorphorus content (μg/g) | below detection limit value | below detection limit value | below detection limit value | below detection limit value |
| sealing material |  |  |  |  |
| Material | Polyurethane resin type | Polyurethane resin type | Polyurethane resin type | Polyurethane resin type |
| Boron content (μg/g) | below detection limit value | below detection limit value | below detection limit value | below detection limit value |
| Organic phosphorus content (μg/g) | Not contained | Not contained | Tributyl phosphate 430 | Tributyl phosphate 430 |
| Boron content in air in local facility (ng/m³) | below detection limit value | below detection limit value | 105 | 80 |
| Organic phosphorus compound content in air in local facility (ng/m³) | below detection limit value | below detection limit value | Tributyl phosphate 250 | Tributyl phosphate 250 |

Industrial Applicability

As described above according to the air filter of the present invention, since the releasing amount of gaseous organic substances can be decreased in the clean room or the local facility having the filter disposed to an air introduction path, the air filter according to the present invention is suitable to a clean room or a local facility, for example, of semiconductor production factories.

Then, since the releasing amount of the gaseous organic substances is reduced in the clean room and the local facility according to the present invention having the air filter described above, if the clean room or the local facility (semiconductor production apparatus) is used, for example, in the industry of semiconductor production, the adsorption amount of the organic substances to silicon wafers is decreased to improve the yield.

Further, since unnecessary doping to silicon wafers may not be caused in the clean room and the local facility of the present invention in which the organic phosphorus compounds and boron compounds are not present, they are particularly suitable to the clean room and the local facility for use in semiconductor production.

What is claimed is:

1. An air filter for trapping air-born particles, comprising:
a filter medium, wherein the filter medium does not release gaseous organic substances more than about 10 μg/g-sample measured by dynamic headspace-gas chromatography/mass spectroscopy at 150° C. for 30 minutes; and
a sealing material, wherein the sealing material does not release gaseous organic substances more than about 50 μg/g-sample measured by dynamic headspace-gas chromatography/mass spectroscopy at 150° C. for 30 minutes;
wherein the gaseous organic substances are aliphatic hydrocarbons having fewer than 20 carbon atoms, phenolic compounds having molecular weights of less than 300, carboxylic acid esters having molecular weights of less than 400, and organic phosphorous compounds having molecular weights of less than 300.

2. An air filter for trapping air-born particles, comprising:
a filter medium; and
a sealing material;
wherein the filter medium and the sealing material substantially do not release gaseous organic substances, and wherein the air filter installed in a clean room does not release gaseous organic substances into the clean room, after 3 days operation measured by the adsorption amount of the gaseous organic substances on a 6 inch diameter silicon wafer left in the clean room for 6 hours, more than about 100 ng (3.53 ng/sq. in of the wafer) measured by a silicon wafer analyzer and
wherein the gaseous organic substances are dibutyl phthalate, dioctyl phthalate, 2-ethylhexyl adipate, 2,6-di-t-butyl-p-cresol, hydrocarbons having fewer than 18 carbon atoms, cyclosiloxanes having fewer than 9 silicon atoms, and tributyl phosphate.

3. An air filter for trapping air-born particles, comprising:
a filter medium;
a frame containing the filter medium, wherein the filter medium and the frame do not release gaseous organic substances more than about 10 μg/g-sample measured by dynamic headspace-gas chromatography/mass spectroscopy at 150° C. for 30 minutes; and
a sealing material firmly sealing the frame and the filter medium, wherein the sealing material does not release gaseous organic substances more than about 50 μg/g-sample measured by dynamic headspace-gas chromatography/mass spectroscopy at 150° C. for 30 minutes;
wherein the gaseous organic substances are dibutyl phthalate, dioctyl phthalate, di-2-ethylhexyl adipate, 2,6-di-t-butyl-p-cresol, hydrocarbons having fewer than 18 carbon atoms, cyclosiloxanes having fewer than 9 silicon atoms, and tributyl phosphate.

4. An air filter for trapping air-born particles, comprising:
a filter medium;
a frame containing the filter medium, wherein the filter medium and the frame do not release gaseous organic substances more than about 10 μg/g-sample; and
a sealing material firmly sealing the frame and the filter medium, wherein the sealing material does not release gaseous organic substances more than about 50 μg/g-sample;
wherein the gaseous organic substances are dibutyl phthalate, dioctyl phthalate, di-2-ethylhexyl adipate, 2,6-di-t-butyl-p-cresol, hydrocarbons having fewer than 18 carbon atoms, cyclosiloxanes having fewer than 9 silicon atoms, and tributyl phosphate.

5. The air filter as defined in claim 4 wherein the release of gaseous organic substances from the filter medium, frame and sealing material is measured by dynamic headspace-gas chromatography/mass spectroscopy at 150° C. for 30 minutes.

6. The air filter as defined in claim 1 wherein the sealing material has a plasticizer which has a main component selected from the group consisting of diisodecyl phthalate, di-2-ethylhexyl azelate, di-2-ethylhexyl sebacate, tris-2-ethylhexyl trimellitate, trioctyl trimellitate, trinonyl trimellitate, tridecyl trimellitate, a polyester obtained by polycondensation of one of adipic acid, azelaic acid, sebacic acid and phthalic acid with one of glycol and glycerine, and epoxidized soybean oil.

* * * * *